United States Patent Office 2,891,605
Patented June 23, 1959

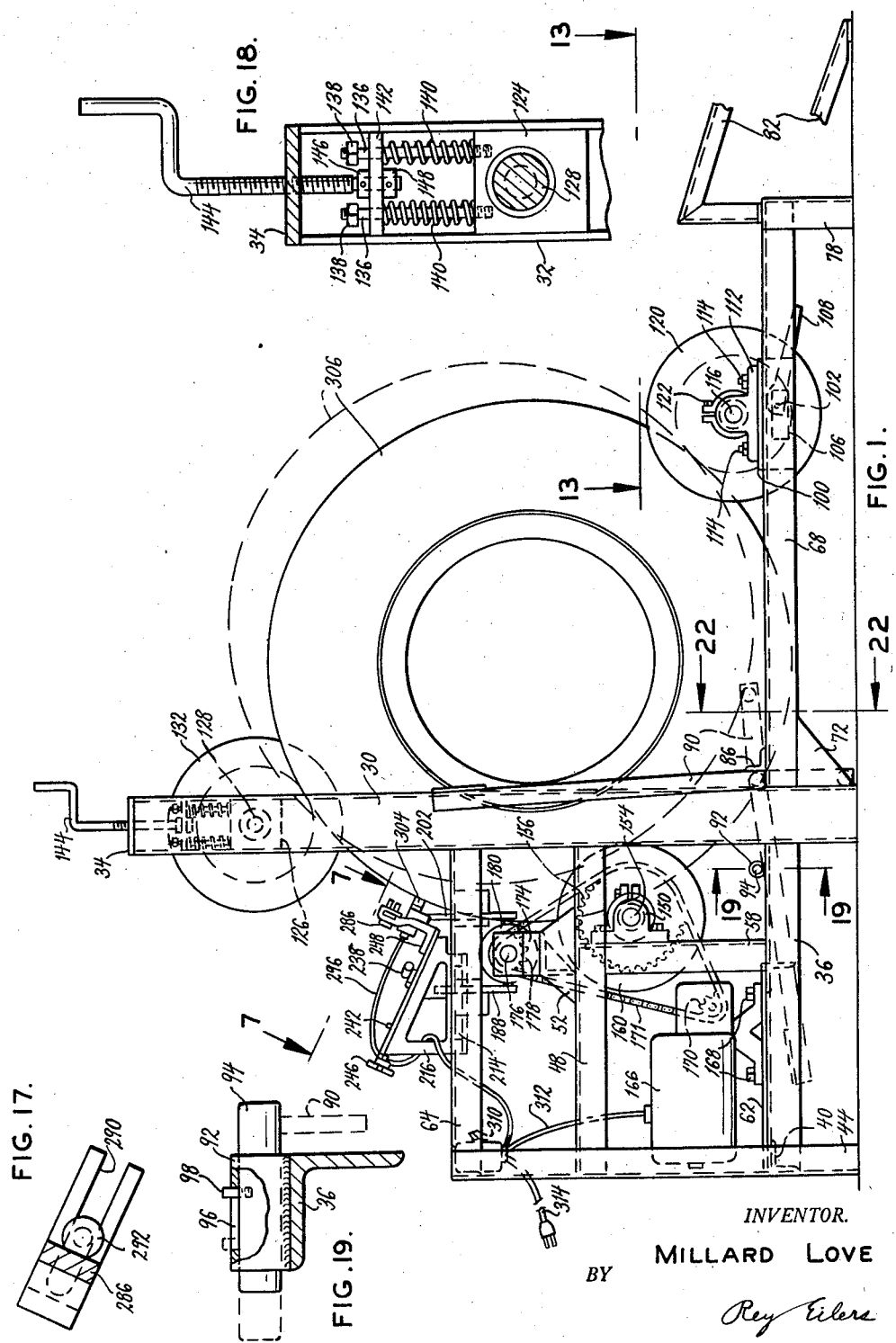

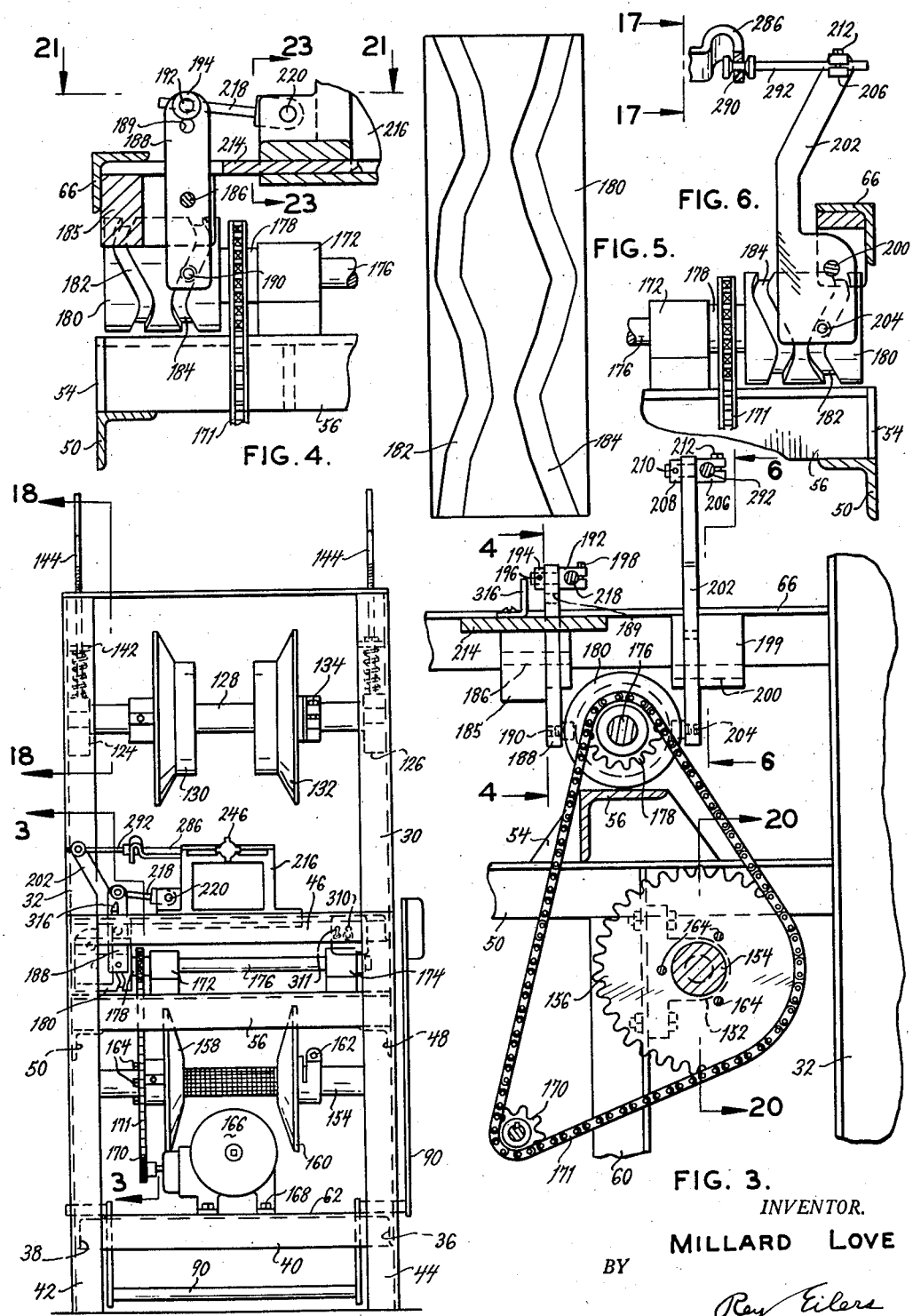

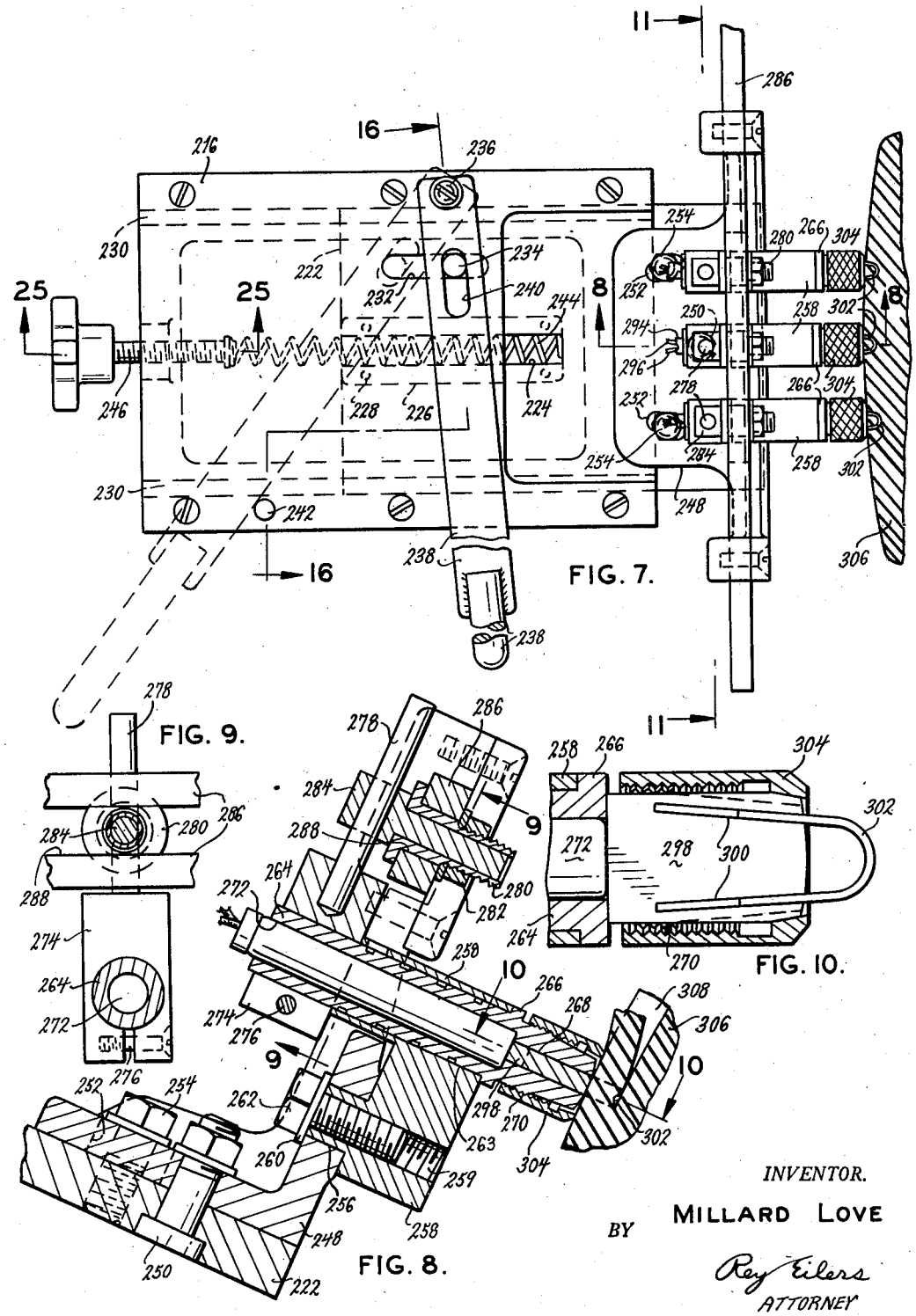

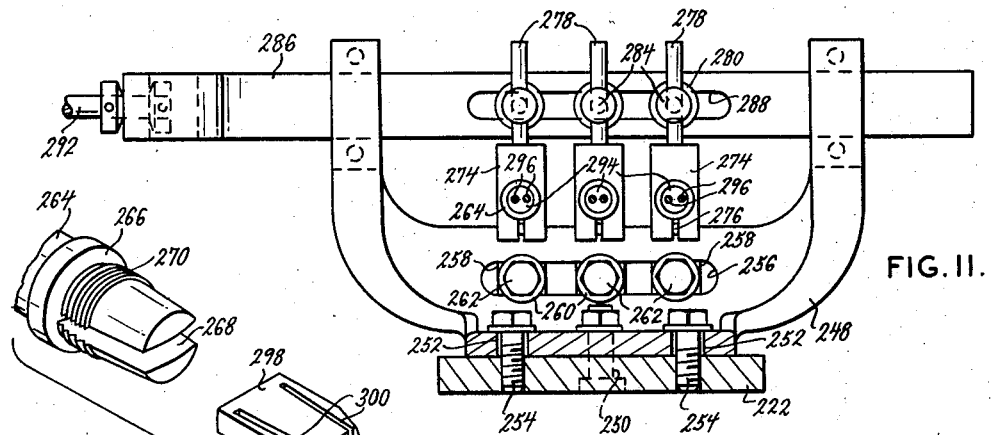
FIG. 11.
FIG. 12.
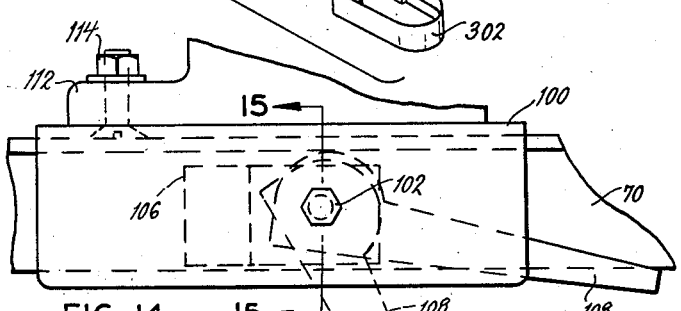
FIG. 14.
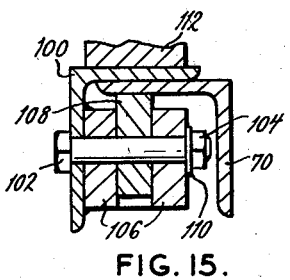
FIG. 15.
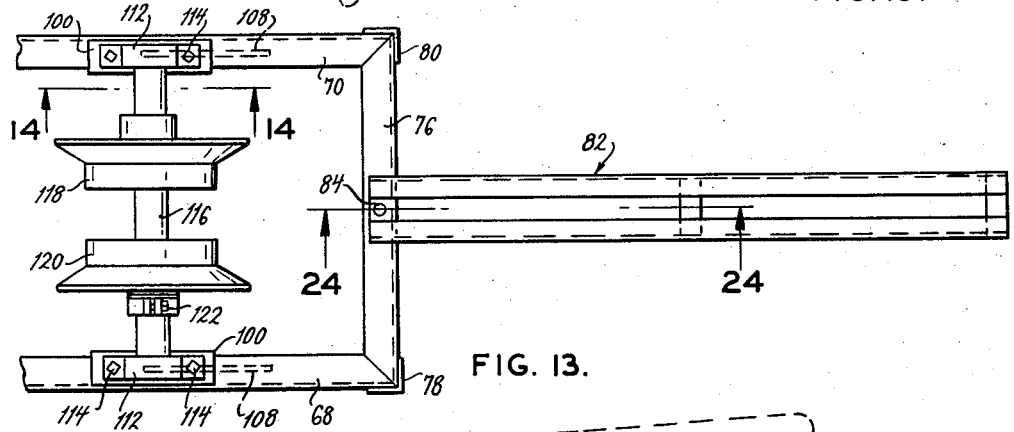
FIG. 13.
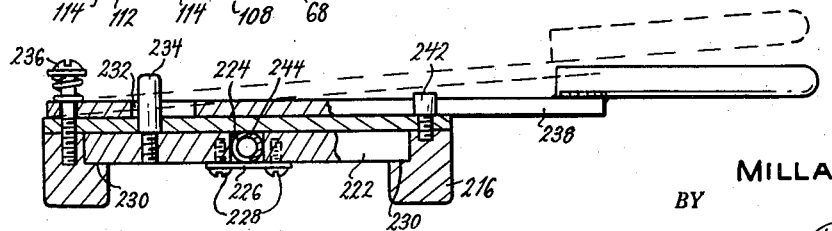
FIG. 16.
INVENTOR.
MILLARD LOVE
BY Rey Eilers
ATTORNEY

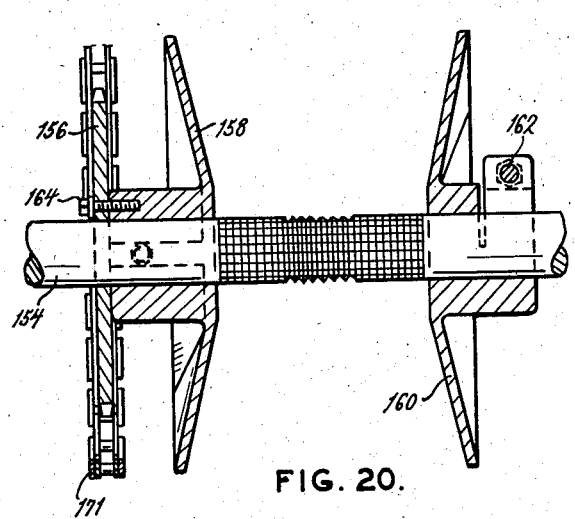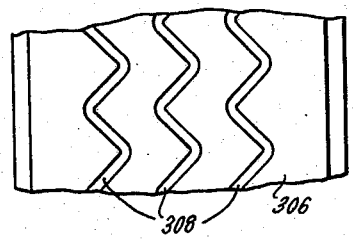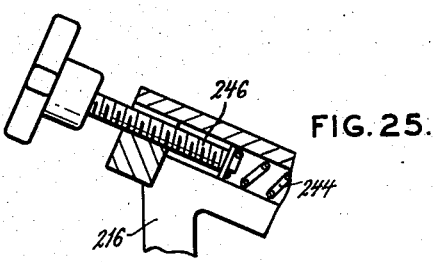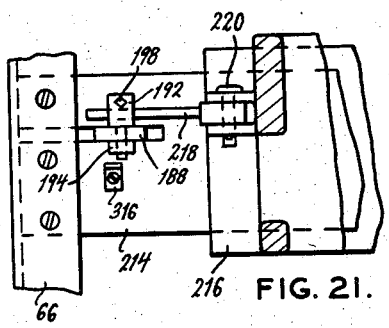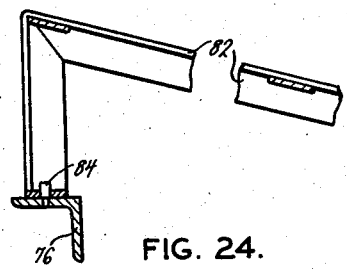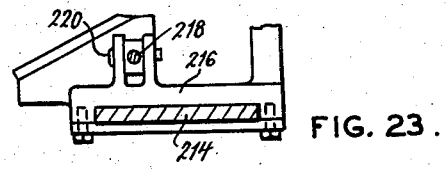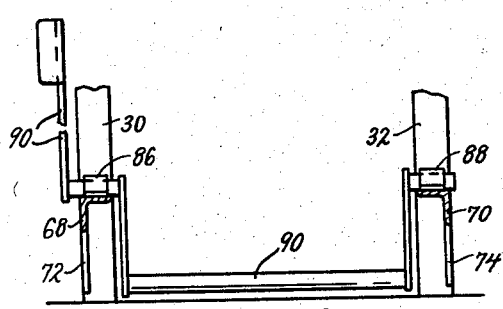

2,891,605

TIRE GROOVING MACHINE HAVING CAM GUIDED CUTTERS CAPABLE OF LATERAL MOVEMENT IN OPPOSITE DIRECTIONS

Millard Love, Affton, Mo.

Application May 24, 1954, Serial No. 431,981

12 Claims. (Cl. 157—13)

This invention relates to improvements in tire grooving machines. More particularly this invention relates to improvements in machines that can groove truck and automobile tires.

It is therefore an object of the present invention to provide an improved machine that can groove truck and automobile tires.

After a vehicle tire has been run for quite a while, the tread will wear away and leave the surface of the tire "bald." Such tires are quite safe, from the structural point of view, but they are not safe from the point of view of skidding on wet or icy streets. Those tires can be rendered safe against skidding by forming in their faces a number of grooves which will provide full gripping of the ground.

A number of different tire grooving devices have been proposed, and a few of them have been used. Most of the tire grooving devices that have been used are essentially hand operated devices. As a result, those devices require skilled operators and require considerable amounts of time. Both of these factors unduly increase the cost of grooving tires, and hence a number of persons and companies do not find it economical to have their tires grooved.

The present invention, on the other hand, provides a tire grooving machine that is largely automatic and that grooves a tire very quickly. That machine can be operated by even very unskilled persons and hence the cost of grooving tires is minimized. Furthermore, the short period of time required to groove a tire with the tire grooving machine of the present invention, further decreases the cost of grooving the tires. It is therefore an object of the present invention to provide a tire grooving machine that is largely automatic and that grooves tires quickly.

The tire grooving machine provided by the present invention has a number of cutters in side by side relation. These cutters form a plurality of grooves in the tire during one rotation of the tire. Hence, in the operation of the tire grooving machine provided by the present invention it is not necessary to rotate the tire a number of times; instead the entire grooving job can be done in one turn of the tire. It is therefore an object of the present invention to provide a tire grooving machine which has a plurality of cutters in side by side relation.

Because the width of tires can vary, particularly between truck tires and passenger tires, it is necessary that the plurality of cutters be adjustable relative to each other. However, once the cutters have been adjusted, they must act in unison. The present invention attains both of these results by mounting the cutters on a bracket and by enabling those cutters to be adjusted relative to that bracket. Once the cutters have been adjusted, they are locked to the bracket and the bracket can then move to provide simultaneous movement of all of the cutters. It is therefore an object of the present invention to provide a bracket for a tire grooving machine which can receive a plurality of cutters and which can permit those cutters to be adjusted individually but which can thereafter move the cutters simultaneously.

To enable the tires to have a very efficient grip on the roadway, it is desirable to form zig zag grooves in the tires. The tire grooving machine provided by the present invention provides such grooves; and it does so by moving the cutters from side to side as the tire rotates past those cutters. The fact that the tires are made of rubber introduces a problem in cutting the groove in the tires because the rubber yields. Consequently, it is necessary to provide a quick movement of the bracket transversely of the tire at the beginning of each change of direction to compensate for the yielding of the rubber. Specifically, as the cutters approach the end of their movement to the left, they must quickly move to the right to compensate for the local distortion of the rubber to the left caused by the movement of the cutters to the left and then to compensate for the local distortion of the rubber to the right as the cutters will begin to move to the right. Consequently, it is necessary to provide a faster movement at the end and beginning of each change of direction of the cutters. The present invention provides such extra fast movement of the cutters at the end and beginning of each change of direction.

The cutters must be small because the grooves themselves are rather small, and such cutters tend to be breakable. Those cutters can be made to have a longer life and to be more resistant to breakage where they are turned into the direction of cut. Specifically, when the cutters are moved to the left, those cutters should be turned to parallel a line which is the resultant of the movement of the bracket transversely of the tire and of the movement of the tire about it axis. The cutters should maintain that inclination until they reach the end of the path of movement of the bracket and then they should pass through dead center to an inclination on the other side of dead center for the movement of the bracket in the opposite direction. Furthermore, all of the cutters should assume the same identical inclination at any time. The present invention provides linkages which cause the bracket to move transversely of the tire and cause the cutters to be parallel to the resultant of the movement of the bracket transversely of the tire and the movement of the tire about its axis.

These linkages must be interconnected in a positive manner to avoid a loss of synchrony between the movement of the cutters and the movement of the bracket. In the absence of such positive interconnection, the cutters might turn the wrong way and be broken as the bracket moves transversely of the tire. The present invention assures this interconnection by having a drum cam with two grooves formed in it. These grooves are machined precisely and will positively hold the linkages in synchrony at all times. It is therefore an object of the present invention to provide a tire grooving machine with a drum cam that has two grooves which positively hold the driving linkages in synchrony at all times.

Most tires are initially made so they are substantially circular. However, some tires can be made to be out-of-round, as by being skidded during emergency stops on the highway. In the grooving of such tires, it is necessary that the cutters follow the low spots as well as the high spots at the periphery of the tires. Otherwise, the depth of the grooves formed by the tire grooving machine will not be uniform and the resultant wear of the tire will lead to a non-uniform gripping of the highway. The present invention makes it possible to attain uniform depth of grooves despite low spots on the surface of the tire, by having the cutters free to follow the surface of the tire. Hence, the cutters will provide full grooving of low spots as well as high spots on the tire. It is therefore an object of the present invention to provide a tire grooving machine wherein the cutters follow the surface of the tire and are thus able to provide full grooving of the low spots as well as the high spots.

It is also important to assure full driving of the tire, even though the tire has low spots as well as high spots. In the absence of a full driving of the tire, the grooving could become erratic and insufficient. The present invention attains full driving of the tire by maintaining the tire under pressure at all times; such pressure positively holding the tire against the driving shaft of the tire grooving machine. It is therefore an object of the present invention to provide a tire grooving machine wherein the tire is positively forced, under pressure, at all times against the driving shaft of the machine.

In the grooving of tires, embedded objects such as nails, particles of glass, particles of gravel or the like can strike the cutters and break them. Hence, it is important that the cutters be readily removable. At the same time, the cutters must be positively held in the proper position prior to and subsequent to their replacement. The present invention attains positive positioning of the cutters and also provides ready replacement of the cutters by mounting those cutters in plates that can be slipped into and removed from chucks held by the bracket of the tire grooving machine. It is a simple matter to loosen the chuck and remove a plate, replace the cutter and then insert the plate in the chuck. The entire operation takes only a matter of seconds, and yet the cutters will be perfectly positioned once they are replaced in the chuck. It is therefore an object of the present invention to provide plates that carry the cutters and that are readily inserted in and removed from chucks.

The grooving operation is made easier and quicker where the cutters are heated. However, it is important to keep the cutters electrically inert to protect the worker. The present invention attains these results by mounting the cutter in a hollow rod of heat-conducting material and by mounting a self-contained electrically-insulated heating element in that rod. The heating element is preferably of the cartridge type and it can be replaced readily in the event it burns out. Furthermore, the rod is made hollow to permit heat to be radiated to the cutter and heat is also supplied to the cutter by conduction through the walls of the rod. In this way, a full and efficient heating of the cutters is attained.

The tire grooving machine provided by the present invention holds each tire in a fixed area and rotates that tire past the cutters. This area will necessarily vary with the diameter of the tire and with the thickness of the tire. The increased diameter of a large tire is accommodated by moving one of the shafts of the tire grooving machine further away. The lesser diameter of smaller tires is accommodated by moving that shaft closer to the other shaft. Variation in the width of tires is accommodated by having tire-guiding surfaces on the shafts which are movable relative to each other. In these ways, the tire grooving machine provided by the present invention can assure full support for tires of many different diameters and widths. It is therefore an object of the present invention to provide a tire grooving machine with shafts that are relatively movable and that have tire-guiding surfaces that are relatively movable along the axes of those shafts.

One of the shafts provided in the tire grooving machine of the present invention is spring biased toward the tire. However, the springs which bias the shaft toward the tire can yield and permit the shaft to be moved away from the tire. This action is very helpful because it enables a pressure on the tire to raise that shaft upwardly and thus free the tire for removal from the machine. This is critical since it avoids all need of obtaining precise adjustment of the shafts of the tire grooving machine. Further, it is critical because it avoids any manual adjustment of the position of the shafts of the tire grooving machine of the present invention during the insertion or removal of a tire. It is therefore an object of the present invention to provide a spring-biased shaft with tire-engaging surfaces thereon for a tire grooving machine.

Many truck tires are quite heavy and they can tax the strength of many men. The present invention provides a lever that enables any man to handle heavy truck tires with ease. That lever normally is out of engagement with the tire being grooved but can be moved into engagement with that tire to force it upwardly and out of the machine. Furthermore, that lever can be locked into position to support that tire at the time it is being introduced into the tire grooving machine. In this way, the present invention enables even small men to handle heavy tires with ease.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing,

Fig. 1 is a side elevational view of a tire grooving machine that is made in accordance with the principles and teachings of the present invention, Fig. 2 is a view of the left hand end of the tire grooving machine of Fig. 1, Fig. 3 is an enlarged view in section of the tire grooving machine of Figs. 1 and 2, and it is taken along the plane indicated by the line 3—3 in Fig. 2, Fig. 4 is a cross sectional view of another portion of the tire grooving machine of Figs. 1 and 2, and it is taken along the plane indicated by the line 4—4 in Fig. 3, Fig. 5 is a developed view of the drum cam used in the tire grooving machine of Figs. 1 and 2, Fig. 6 is a cross sectional view of another portion of the tire grooving machine of Figs. 1 and 2, and it is taken along the broken plane indicated by the line 6—6 in Fig. 3, Fig. 7 is a cross sectional view in plan of another portion of the tire grooving machine of Figs. 1 and 2, and it is taken along the plane indicated by the line 7—7 in Fig. 1, Fig. 8 is a cross sectional view of the cutter head and bracket of the tire grooving machine of the present invention, and it is taken along the plane indicated by the line 8—8 in Fig. 7, Fig. 9 is another sectional view through the bracket and cutters of the tire grooving machine of the present invention, and it is taken along the broken plane indicated by the line 9—9 in Fig. 8, Fig. 10 is an enlarged view through the supporting rod, plate and cutter of Fig. 8, and it is taken along the plane indicated by the line 10—10 in Fig. 8, Fig. 11 is a sectional view of the portion of the tire grooving machine shown in Fig. 7, and it is taken along the plane indicated by the line 11—11 in Fig. 7, Fig. 12 is a perspective view, in exploded manner, of a portion of the supporting rod and the plate and cutter of the tire grooving machine provided by the present invention, Fig. 13 is a plan view of a portion of the tire grooving machine of Figs. 1 and 2 and it is taken along the plane indicated by the line 13—13 in Fig. 1, Fig. 14 is a side elevational view of a portion of a movable bearing housing for the tire grooving machine of the present invention, and it is taken along the plane indicated by the line 14—14 in Fig. 13, Fig. 15 is a cross sectional end view of a portion of the bearing housing of Fig. 14, and it is taken along the plane indicated by the line 15—15 in Fig. 14, Fig. 16 is a cross sectional view through the portion of the tire grooving machine shown in Fig. 7, and it is taken along the broken plane indicated by the line 16—16 in Fig. 7, Fig. 17 is a cross sectional view of a portion of the tire grooving machine shown in Fig. 6, and it is taken along the plane indicated by the line 17—17 in Fig. 6, Fig. 18 is an enlarged view, in section, of a portion of the tire grooving machine of Figs. 1 and 2, and it is taken along the plane indicated by the line 18—18 in Fig. 2, Fig. 19 is a cross sectional view of a portion of the tire grooving machine of Figs. 1 and 2, and it is taken along the plane indicated by the line 19—19 in Fig. 1, Fig. 20 is a cross sectional end view of the portion of the tire grooving machine shown in Fig. 3, and it is taken along the plane indicated by the line 20—20 in Fig. 3, Fig. 21 is a sectional view in plan of the portion of the tire grooving machine shown in Fig. 4, and it is taken along the plane indicated by the line 21—21 in Fig. 4, Fig. 22 is a cross sectional end view of a portion of the tire grooving machine shown in Figs. 1 and 2, and it is taken along the plane indicated by the line 22—22 in Fig. 1, Fig. 23 is a cross sectional side view of the portion of the tire grooving machine shown in Fig. 4, and it is taken along the plane indicated by the line 23—23 in Fig. 4, Fig. 24 is a cross sectional side view of part of the portion of the tire grooving machine shown in Fig. 13, and it is taken along the plane indicated by the line 24—24 in Fig. 13, Fig. 25 is a sectional side view of a part of the portion of the tire grooving machine of Fig. 7, and it is taken along the plane indicated by the line 25—25 in Fig. 7, and Fig. 26 is a front elevational view of a portion of the face of a tire which has been grooved by the tire grooving machine of the present invention.

Referring to the drawing in detail, the numeral 30 denotes a vertically directed channel at one side of the tire grooving machine provided by the present invention. A similar vertically directed channel 32 is provided at the opposite side of the tire grooving machine provided by the present invention, and the open faces of those channels are in confronting relation. The channels 30 and 32 are sturdy and provide a rigid support for the tire grooving machine. A top plate 34 spans the channels 30 and 32, and will be suitably secured to those channels as by welding. An angle 36 has one end thereof suitably secured to the channel 30 a short distance above the bottom of that channel, and that angle extends horizontally from that channel. A similar angle 38 is similarly secured to the channel 32, and the angle 38 also extends in a horizontal direction. The free ends of the angles 36 and 38 are secured together by a transversely extending angle 40. The free ends of the angles 36 and 38, and the angle 40 are supported by vertically directed angles 42 and 44. The bottoms of the angles 42 and 44 are level with the bottoms of the channels 30 and 32, and thus they will hold the tire grooving machine level when it is set on a level support, such as a floor. The upper ends of the angles 42 and 44 are suitably connected together by a horizontal angle 46. The angles 42 and 44 will be parallel to the channels 32 and 30, and horizontal angles 48 and 50 will extend between channel 30 and angle 44 and channel 32 and angle 42 respectively. These angles will be suitably secured to the channels 30 and 32 and to the angles 42 and 44 by welding. The horizontal angle 48 will support a trapezoidal plate 52, while the horizontal angle 50 will support a trapezoidal plate 54. These two trapezoidal plates will, in turn, support the opposite ends of a horizontal angle 56 which extends transversely of the tire grooving machine. Vertically directed angles 58 and 60 extend upwardly from the angles 36 and 38 and are connected to the horizontal angles 48 and 50. These angles 58 and 60 furnish support for the angle 56 through the medium of the angles 48 and 50 and the trapezoidal plates 52 and 54. A generally T-shaped platform which has a thick stem and a narrow cross is denoted by the numeral 62; and that platform has the end of its stem resting upon and being secured to the horizontal angle 40. The ends of the T of that platform are secured to the angles 36 and 38. Horizontally disposed angles 64 and 66 extend from the channels 30 and 32 to the vertically directed angles 44 and 42. These angles 64 and 66 coact with the other angles and with the channels 30 and 32 to provide a strong, sturdy and rigid structure. This structure supports the major part of the active elements of the tire grooving machine of the present invention.

Horizontally disposed angles 68 and 70 extend to the right of the channels 30 and 32, as those channels are viewed in Fig. 1. These angles are in register with the angles 36 and 38 of the tire grooving machine. The ends of the angles 68 and 70 will be suitably secured to the channels 30 and 32 as by welding. Triangular plates 72 and 74 are connected to the channels 30 and 32 and to the angles 68 and 70, as by welding. These triangular plates help stiffen the tire grooving machine of the present invention. The free ends of the angles 68 and 70 are connected together by a horizontally directed angle 76. The free ends of the angles 68 and 70, and the angle 76, are supported by vertically directed angles 78 and 80. These latter angles serve as legs for the right hand end of the tire grooving machine provided by the present invention, and they will be suitably secured, as by welding, to the angles 68, 70 and 76. The various angles, plates, and channels recited herein will coact to define a strong, sturdy and rigid, but nevertheless light weight, frame for the tire grooving machine of the present invention.

The numeral 82 denotes a ramp which can be secured to the horizontal angle 76 by a pin 84. The ramp is preferably made from two angle irons which have been cut away and then bent to define a short vertical leg and an elongated and inclined plane. The two angle irons are suitably connected together by cross pieces, and those cross pieces will preferably be welded to those angle irons. The resulting ramp is light weight but strong and rigid and will be able to guide tires onto the frame of the tire grooving machine of the present invention.

A short angle 86 is secured to the angle 68 a short distance to the right of the channel 30, as that channel is viewed in Fig. 1. A short angle 88 is secured to the angle 70 a short distance from the channel 32; and the short angles 86 and 88 are is register with each other. These angles coact with the channels 30 and 32 to provide a small area into which the pivot portion of a lever 90 extends. That lever has two aligned pivot portions that fit into the space defined by the angles 86 and 88 with the channels 30 and 32, it has an elongated arm with a foot pedal thereon, it has two eccentric arms secured to the pivot portion, and it has a connecting rod between the free ends of those eccentric portions. This connecting rod portion of the lever 90 can be rotated upwardly to engage and lift a tire being grooved. The raised position of the connecting rod section of the lever 90 is indicated by dotted lines in Fig. 1. The inactive position of the lever 90 is shown by solid lines in Fig. 1. A sleeve 92 is suitably secured to the horizontal angle 36, as by welding, and that sleeve receives a reciprocable latch 94. The latch 94 has a pin 98 therein, and that pin extends into and is confined by a slot 96 in the sleeve 92. The pin 98 will coact with the slot 96 to permit limited reciprocation of the latch 94. That reciprocation will be sufficient to enable the latch 94 to overlie the lever 90, as indicated particularly in Fig. 19. In that figure, the lever is shown in dotted lines.

The numeral 100 denotes angles which have slotted blocks 106 secured to them. As emphasized particularly in Fig. 15, the edges of the slotted blocks 106 are welded to the vertical portions of the angles 100, and they are welded to those vertical portions of the angles in such a way that there is a gap between the top of the block and each under face of the horizontal portion of each angle 100. The spaces that are provided in this manner enable the angles to telescope over the horizontal portion of either the horizontal angle 68 or the horizontal angle 70. A bolt 102 extends through a suitable opening in the vertical wall of each angle 100 and through a corresponding opening in each slotted block 106. A washer 110 is telescoped over the threaded end of each bolt 102, and nuts 104 hold the bolts 102 and the washers 110 in assembled relation with the slotted blocks 106. A cam-like clamp or lock 108 is mounted in the slot of each block 106, and it rotates about the bolt 102. The cam portion of the lock 108 selectively engages the horizontal wall of the angle 68 or 70 to lock the angles 100 against movement relative to those horizontal angles. However, when the locks 108 are lowered down to the position shown by dashed lines in Fig. 14, the cam portions of those locks are not in engagement with the horizontal angles 68 or 70, and the angles 100 can be slid along the horizontal angles 68 or 70 with ease. When it is desired to lock the angles 100 relative to the horizontally disposed angles 68 or 70, it is only necessary to press upwardly on the locks 108 and force the cam portions of those locks into binding engagement with the horizontal portions of the angles 68 and 70. The angles 100 thus constitute slides, and those slides carry bearing housings 112. The bearing housings 112 are secured to the angles 100 by bolt and nut combinations 114. The bearing housings 112 support self-aligning bearings, not shown, and those bearings support rotatable shaft 116. The shaft 116 extends transversely of the frame of the tire grooving machine, and it will normally be fixed for rotation in one position. However, whenever it is desired to move the shaft 116, it is only necessary to lower the locks 108 and then telescope the slides 100 along the lengths of the angles 68 and 70. The self-aligning nature of the bearings in the bearing housings 112 avoids all need of precise setting of the slides 100.

A tire-guiding surface 120 is mounted on the shaft 116. This tire-engaging element preferably takes the form of a flanged disk. A similar flanged disk 118 is also mounted on the shaft 116. The flanged disk 118 is suitably locked to the shaft 116, as by a key or a set screw. The flanged disk 120, however, can be reciprocated along the axis of the shaft 116 whenever the split ring of that disk is loosened. However, when that split ring is tightened, as by rotating the bolt 122, the flanged disk 120 is positively locked against accidental reciprocation along the axis of the shaft 116. By loosening the bolt 122, it is possible to move the flanged disk 120 relative to the fixed flanged disk 118, and this is desirable since it enables those disks to accommodate tires of varying width. The axially extending portions of the disks will receive part of the face of the tire while the generally radially extending portions of the flanges of the disks will confine and guide the sides of the tires. The confinement of the tire need not be overly close, but it must be close enough to avoid wobbling of the tire in the tire grooving machine.

Bearing housings 124 and 126 are provided that will fit within and be guided by the channels 32 and 30 respectively. These bearing housings support self-aligning bearings, not shown, and those bearings support rotatable shaft 128. That shaft carries a tire-engaging element 130 which is similar to the tire-engaging element 118 on shaft 116. The shaft 128 also carries a reciprocable tire-engaging element 132 which is similar to the reciprocable tire-engaging element 120 on shaft 116. The tire-engaging element 132 has a split ring which permits reciprocation of that element relative to the shaft 128, but it also has a bolt 134 which can tighten that split ring and prevent accidental reciprocation. The flanged disk 130 on the shaft 128 is in register with the flanged disk 118 on the shaft 116. The flanged disk 132 will preferably be moved into registry with the flanged disk 120 on the shaft 116. In this way, full and complete alignment of the tire is assured. Each of the bearing housings 124 and 126 has two rods 136 extending upwardly therefrom. These rods extend through spaced openings in spring-confining plates 142. Helical springs 140 surround each of the rods 136 and bear against the upper surfaces of the bearing housings 124 and 126 while also bearing against the under surfaces of the plates 142. Nuts 138 are threaded onto the upper ends of the rods 136 after the plates 142 have telescoped down over the upper ends of those rods, and those nuts maintain the plates 142 and the springs 140 in assembled relation with the rods 136 and with the bearing housings 124 and 126. Adjusting screws 144, with crank handles on their upper ends, extend through threaded openings in the horizontal plate 34. The lower ends of the adjusting screws 144 extend through openings in the plates 142, and collars 146 and 148 are secured to the lower ends of the adjusting screws 144 immediately above and immediately below the plates 142. The collars 146 and 148 maintain the adjusting screws 144 in assembled relation with the plates 142 while permitting rotation of those adjusting screws relative to those plates. Rotation of the adjusting screws 144 will react with the threaded openings in the horizontal plate 34 to move the plates 142 upwardly or downwardly. Movement of the plates 142 downwardly will compress the helical springs 140 and tend to force the bearing housings 124 and 126 downwardly. The degree of force created within the springs 140 can be adjusted very readily by rotation of the adjusting screws 144.

A bearing housing 150 is suitably bolted to the vertical angle 58, and a bearing housing 152 is suitably bolted to the vertical angle 60. The bearing housings 150 and 152 will be in register with each other. Each of those bearing housings supports a self-aligning bearing, not shown, and those bearings rotatably support the shaft 154. The central portion of the shaft 154 has a number of sharp, axially directed splines formed on it, and those splines will engage the outer face of a tire disposed in the tire grooving machine of the present invention and will drive that tire. Tire-engaging elements 158 and 160, in the form of disks, are mounted on the shaft 154. The flange 158 is in register with the flanged disks 130 and 118. The flange 160 can reciprocate along the length of the shaft 154 whenever the bolt 162 loosens the split ring on that flange. However, suitable tightening of the bolt 162 will lock the flange 160 against accidental reciprocation. The tire-engaging elements 118 and 120, 130 and 132, and 158 and 160 will guide a tire without providing excessive side thrusts on that tire. At the same time, those tire-engaging elements will fully resist movement of the tire in a sideways direction. The disk portions of the elements 118 and 120, and of the elements 130 and 132 will coact with the splined section of the shaft 154 to provide a tight pressure on the tire. It will be noticed that the shaft 128 is disposed between the shafts 116 and 154. This disposition of the shaft 128 coacts with the spring bias on the shaft to force a tire downwardly against the splines on the shaft 154. Hence, a full and positive driving action can be attained between the tire and the splines on the shaft 154. Thus full and complete driving action will always be present, irrespective of low spots on the surface of the tire, because the springs 140 will enable the tire-engaging elements 130 and 132 to follow any such low spots and continue to force the tire into driving engagement with the splines on the shaft 154.

A sprocket wheel 156 is suitably secured to the shaft 154, as by being fixedly secured to the flange support 158 by bolts 164. Hence the flange 158, the shaft 154 and the sprocket wheel 156 will rotate as a unit.

The numeral 166 denotes a reversible gear motor which is secured to the platform 62 by bolts 168. The shaft of the gear motor 166 has a sprocket pinion 170 secured to it by a key or set screw. The sprocket pinion 170 engages and drives the sprocket chain 171. This sprocket chain extends around the sprocket wheel 156 and also drives that wheel. Hence, rotation of the shaft of the gear motor 166 will cause rotation of the driving shaft 154.

Bearing housings 172 and 174 are mounted on the horizontal angle 56 which extends between the trapezoidal plates 52 and 54. These bearing housings support a rotatable shaft 176. This shaft has a sprocket pinion 178 mounted thereon, as by a key or set screw. This sprocket pinion also engages the sprocket chain 171, and it too is driven by that sprocket chain. Hence, rotation of the gear motor 166 causes rotation of the shaft 154 and rotation of the shaft 176.

A drum cam 180 is mounted on the rotatable shaft 176, and it will be suitably locked to that shaft by a key or set screw. The cam 180 has two grooves 182 and 184 formed therein. Those grooves are best shown in Fig. 5 wherein the entire surface of the cam 180 is developed.

A pivot block 185 is secured to the horizontal angle 66, as by welding, and that pivot block supports a pivot 186. This pivot rotatably supports the lever 188, and the lower end of that lever carries a cam follower 190. The cam follower 190 extends into and is moved by the groove 184 of cam 180. A slotted pin 192 is mounted at the upper end of the lever 188, and that pin is free to rotate relative to the lever 188. A washer 194 is provided on the portion of the pin 192 that extends through the upper end of the lever 188, and a pin 196 extends through the washer 194 and the end of the pin 192 to maintain that pin in assembled relation with the washer 194 and the lever 188. A bolt 198 is mounted adjacent the slot at the opposite end of the pin 192, and the bolt 198 can be tightened to clamp the slotted end of the pin 192 onto a tie-rod 218.

The numeral 199 denotes another pivot block that is secured to the horizontally disposed angle 66 as by welding. This block supports the pivot 200, and a lever 202 pivots about the pivot 200. The lower end of the lever 202 carries a cam follower 204, and that follower extends into and is guided by the groove 182 of cam 180. A slotted pin 206 is carried by the upper end of the lever 202, and one end of that pin extends through the upper end of that lever. A collar 208 extends over that projecting end of the pin 206, and it is secured to that pin by a pin 210. The pin 206 is free to rotate relative to the lever 202, but it is held against accidental separation from that lever by the collar 208 and the pin 210. A bolt 212 is mounted in the slotted end of the pin 206 and that bolt can be tightened to clamp the slotted end of the pin 206 on the tie-rod 292.

The numeral 214 denotes a guide plate that extends between and is suitably secured to the horizontally directed angles 64 and 66. This guide plate extends transversely of the tire grooving machine provided by the present invention and it guides and confines a cross slide 216. The cross slide is fabricated from machined parts so it can be selectively secured to and separated from the guide plate 214.

The tie-rod 218 has a cylindrical shank which can be clamped within the slotted end of the pin 192, and it has an enlarged head which extends within a slot in the cross slide 216. A pin 220 extends through the slot in the cross slide 216 and through an opening in the enlarged head of the tie-rod 218 to prevent accidental separation of that tie-rod from the cross slide 216. Consequently, when the shank of the tie-rod 218 is clamped to the slotted pin 192, rotation of the lever 188 about the pivot 186 will cause reciprocation of the cross slide 216. That rotation of the lever 188 is assured by the interaction of the cam follower 190 with the groove 184 in the rotatable drum cam 180.

The cross slide 216 has spaced shoulders 230 on the upper portion thereof, and those spaced shoulders receive and guide platform 222. The shoulders 230 confine the platform 222 for reciprocable movement longitudinally of the tire grooving machine. A slot 224 is machined in the platform 222, and a cover plate 226 is provided on the bottom of the platform 222 to underlie the slot 224. Fasteners 228, such as screws, are used to hold the cover plate 226 in position relative to the platform 222.

A slot 232 is provided in the upper surface of the cross slide 216, and that slot is parallel to the shoulders 230 on that cross slide. A pin 234 extends upwardly from the platform 222, and that pin is disposed within the elongated slot 232. The elongation of the slot 232 permits reciprocable movement of the platform 222 relative to the cross slide 216, but it limits that reciprocable movement to a predetermined length of travel. A pivot 236 is mounted on the cross slide 216 at one side of the slot 232, and that pivot supports a lever 238. This lever extends across and overlies the top of the cross slide 216, and it has an elongated slot 240 in register with the pin 234 on the platform 222. Rotation of the lever 238 about the pivot 236 will force the pin 234, and thus the platform 222, to reciprocate relative to the cross slide 216. A stop 242 is provided on the cross slide 216 at the edge opposite to the edge where the pivot 236 is located. This stop is short in height and the lever 238 can be lifted upwardly to pass over the top of that stop. However, when the lever is not lifted, it will be in register with that stop. As a result, when the lever 238 is moved to the dotted position shown in Fig. 7, the stop 242 will hold that lever against movement to the position shown by solid lines in that figure. However, it is a simple and easy matter to lift the lever 238 upwardly and move it over and beyond the top of the pin 242. A helical spring 244 is disposed within the slot 224 in the platform 222. One end of the spring 244 will bear against the inner end of the slot 224 in the platform 222, while the other end of the spring can selectively bear against the end of a screw 246 that is provided with a readily grasped knob. This screw and knob are denoted by the numeral 246. The screw 246 is suitably mounted in a threaded opening in the cross slide 216, and rotation of the screw 246 will vary the pressure which is applied to the spring 244. That pressure will tend to force the platform 222 to move toward the right hand end of the cross slide 216, as that cross slide is viewed in Fig. 7.

The numeral 248 denotes a bracket with two upwardly extending arms that form a wide U. A pivot 250 extends through the bracket 248 and seats in the platform 222. This pivot holds the bracket 248 in assembled relation with the platform 222 but permits that bracket to rotate relative to that platform. Two arcuate slots 252 are formed in the bracket 248 on opposite sides of the pivot 250, and bolts 254 extend through those slots. These bolts seat in the platform 222, and they can be tightened to clamp the bracket 248 against rotation relative to that platform. Conversely, the bolts 254 can be loosened to permit rotation of the bracket 248 relative to the platform 222.

The bracket 248 has a horizontally directed slot 256 in the vertically directed closed end of the U formed by that bracket. This slot is elongated and it is almost as long as the platform 222 is wide. A number of pivot blocks 258 are mounted in the slot 256 and they have square faced projections disposed within the slot 256 to resist rotation of those blocks relative to that slot. The pivot blocks 258 have threaded openings 259 that can receive the threaded shanks of bolts 262. Washers 260 encircle the shanks of the bolts 262 and bear against the face of the bracket 248. The bolts 262 and the washers 260 can coact with the pivot blocks 258 to lock those pivot blocks in position on the bracket 248. However, the bolts 262 can be loosened to permit the pivot blocks 258 to be slid along the length of the slot 256, and they can even be loosened to permit removal of the pivot blocks 258 from the slot 256. In the particular modification shown in the drawing, three such pivot blocks 258 are shown, but a greater or lesser number of those pivot blocks can be used.

Each of the pivot blocks 258 has an opening 263 therethrough. The opening 263 receives a support 264 in the form of an elongated hollow rod, and the rod 264 telescopes readily within the opening 263 in the pivot block 258. Moreover, the rod 264 can rotate readily relative to the pivot block 258. A radially extending shoulder 266 is provided on the support 264 and that shoulder extends outwardly beyond the outer diameter of the opening 263 in the pivot block 258. Hence, the shoulder 266 limits the extent to which the support 264 can extend into the opening 263.

A recess 268 of rectangular cross section is formed in one end of the support 264. Threads 270 are formed on that same end of the support 264 and a generally frusto-conical surface extends forwardly beyond the threads 270. The recess 268 in the support 264 is contiguous with an elongated recess 272 that extends inwardly from the opposite end of the support 264. Consequently, the support 264 has a passage which extends completely through that support.

The other end of the support 264 extends outwardly from the opening 263, and that projecting end of the support 264 is encircled by a slotted clamp 274; and that clamp is best shown in Fig. 9. The clamp will telescope snugly around the projecting end of the rod 264, and it has a screw 276 which can be tightened to lock the clamp 274 onto the projecting end of the support 264. Hence, the clamp 274 and the support 264 can be made to rotate relative to the opening 263 in the pivot block 258 as a unit.

The clamp 274 has a pin 278 extending upwardly from the upper end thereof. As indicated by Fig. 8, the pin 278 is preferably embedded in the upper end of that clamp. The upper end of the pin 278 extends through an opening in a pivot 284. This pivot is rotatably mounted in a pivot block 280 which is held in a slot 288 of a connecting rod 286. The pivot block 280 has a threaded portion that can receive a nut 282. When the nut 282 is tightened on the threaded portion of the pivot block 280, that nut will bear against the connecting rod 286 and prevent relative movement between the pivot block and the connecting rod. However, when the nut 282 is loosened, the pivot block 280 can be slid along the length of the slot 288 in the connecting rod 286.

The connecting rod 286 has one end thereof bent transversely of the axis of that rod. A slot 290 is formed in the transversely bent end of the connecting rod 286 and that slot releasably receives the tie-rod 292 which is held by the slotted pin 206. This tie-rod has two shoulders formed thereon, as indicated particularly in Fig. 6, and those shoulders are disposed on opposite sides of the transversely directed end of the connecting rod 286. Those shoulders prevent accidental separation of the tie-rod 292 from the connecting rod 286. However, those shoulders do not bind with the transversely extending end of the connecting rod 286, and this fact plus the existence of the slot 290 permits the tie-rod 292 to move relative to the connecting rod 286. Thus the tie-rod 292 and the connecting rod 286 have a sliding connection therebetween.

The recess 272 in the support 264 can receive a self-contained electrically-insulated resistance element 294. Preferably this resistance element will be of the cartridge type that can readily be inserted in the recess 272 and withdrawn from that recess as a unit. This unit will fit the opening or recess 272 in the support 264 rather snugly but it will be readily removed from that recess when desired. Leads 296 extend outwardly from the rear end of the cartridge resistance element 294, and those leads extend to a switch 310. This switch is suitably mounted on the horizontally disposed angle 46.

A generally rectangular plate 298 is provided that can be disposed within the recess 268 of the support 264. The forward end of the plate 298 has a chamfer at each side thereof and that chamfer is generally similar to the angularity of the conical portion of the support 264. However, the chamfered faces of the plate 298 project outwardly beyond the conical face of the support 264. Two slots 300 extend inwardly from the forward face of the plate 298. Those slots are inclined relative to each other and they are further apart adjacent the rear of the plate 298 than they are adjacent the front edge of that plate. These slots define a central anvil for the plate 298 and also define two bendable fingers for that plate. A generally U-shaped cutter or knife 302 is disposable in the slots 300 of the plate 298. The cutter 302 is made of spring steel and it is resilient. Hence, while the cutter 302 has the arms thereof inclined apart at a predetermined angle, that angle can be varied slightly. The cutter 302 is generally U-shaped and has a smoothly rounded closed end. The cutter 302 is sharpened so that it is sharp on both of its faces. Specifically, the cutter 302 is sharpened to a knife edge at its upper edge and its lower edge, and it has a ridge extending along its inner surface where the cutting edges terminate. That ridge and those cutting edges do not extend all the way to the ends of the arms of the cutter 302; instead the end portions of the arms of the cutters are left flat to secure positive positioning of the cutter 302 in the slots 300 of the plate 298.

The smoothly rounded closed end of the cutter 302 and the inclined disposition of the legs of that cutter are important since they enable that cutter to resist breakage to a remarkable extent. The smoothly rounded configuration of the closed end of the cutter avoids the concentration of stresses and fatigue forces at any one point in the end of the cutter, and the inclination of the legs enables those legs to resist side thrusts. Consequently, the cutter provided by the present invention is remarkably strong and resistant to breakage.

A threaded retainer 304 is provided which can telescope over the cutter 302 and can telescope over the plate 298. That threaded retainer, which is best shown in Fig. 10, has a conical surface at its interior adjacent the outer end thereof. This conical surface will coact with the chamfered ends of the bendable fingers of plate 298 to force those fingers into locking engagement with the knife or cutter 302. Hence, the retainer 304 and the support 264 coact with the plate 298 to constitute a readily loosened and tightened chuck for the cutter 302. To insert a new cutter 302, it is only necessary to loosen the retainer 304 on the threads 270, and pull the legs of the old cutter out of the slots 300. Thereafter, the legs of the replacement 302 can be squeezed together until they are in register with the slots 300, and then those legs can be moved into those slots.

The distance between the closed end of the cutter 302 and the outer face of the plate 298 can be adjusted; the resiliency of the cutter 302 making this possible. This variation is important since that distance directly determines the depth of the groove formed by the cutter 302. To set that distance, a gage can be inserted between the closed end of the cutter 302 and the outer end of the plate 298, the cutter 302 can be pressed tightly against that gage, the retainer 304 can be tightened onto the threads 270, and the gage can be removed. The tightening of the retainer 304 will positively lock the cutter 302 against movement relative to the plate 298 and to the rod 264. The outer end of the retainer 304 is smooth, and it will rest against the face of the tire during the grooving operation. The cutter 302 will, of course, project beyond the end of the retainer 304 and will extend into the surface of the tire. The numeral 306 denotes a typical tire to be grooved; and that tire can be given the highly desirable diagonal grooves 308 shown in the drawing.

A switch 311 is mounted adjacent the switch 310; and the switch 311 controls the operation of the reversible gear motor 166. A suitable flexible lead 314 extends from the switches 310 and 311 to a wall plug, and the lead 312 extends from the switch 311 to the motor 166.

A pointer 316 is mounted on the guide plate 214 adjacent the slotted pin 192 that is carried by the lever 188. A mark will be provided in the projecting end of the pin 192 adjacent the geometric center of that pin, and that mark will be registerable with the pointer 316. A suitable wrench-receiving recess will be formed in the end of the projecting shaft of the motor 166 to permit indexing of that motor. This is desirable since it facilitates the setting of the mark on the pin 192 in registry with the pointer 316.

In using the tire grooving machine of the present invention to groove a tire, the operator first measures the width of the tire and sets the flanged disks 120 and 132 so they are spaced from the disks 118 and 130, respectively, a distance just slightly greater than the width of the tire. The operator will also move the flanged support 160 relative to the flanged support 158 so the distance between them is just slightly greater than the width of the tire. The flanged disks 118 and 130 are always maintained in register with each other and with the flanged support 158, and hence the shifting of the flanged disks 120 and 132 and the flanged support 160 to provide the desired spacing from those flanged disks and that flanged support 160 will align the tire-engaging elements of the machine.

The operator then rotates the lever 90 from the position indicated by solid lines in Fig. 1 to the position indicated by dotted lines in Fig. 1, and he will also move the latch 94 until it overlies and holds the lever 90. Moreover, the operator will grasp the lever 238 and pull it rearwardly until it is disposed behind, and is held by, the stop 242. At this time the tire grooving machine is ready to receive a tire 306. The operator then rolls the tire toward the lower end of the ramp 82 and proceeds to roll it up that ramp. This arrangement enables the operator to create enough momentum in heavy tires to get them to roll up the ramp 82 with ease. When the tire 306 rolls off of the upper end of ramp 82, it will engage and be supported by the disk portions of the flanged disks 118 and 120 and by the disk portions of the flanged disks 130 and 132. The normal setting of the flanged disks 130 and 132 will be below the level of the portion of the tire 306 which those disks are to engage; and the final setting of those disks is spaced from that normal setting a distance less than the "take up" afforded by the springs 140. Consequently, when the tire 306 rolls off the upper end of ramp 82, part of the momentum of that tire will be absorbed by the yielding of the springs 140; those springs yielding to permit the disks 130 and 132 to move upwardly to accommodate the upper part of that tire. The tire will continue to move away from the ramp 82 until it strikes and is held by the connecting rod portion of the lever 90. At this time, the tire will occupy the position shown by dashed lines in Fig. 1.

One important reason for using the lever 238 to retract the platform 222 and the bracket 248, and for locking the lever 90 in the position shown by dashed lines in Fig. 1, is to protect the cutters 302 from being broken by the tire as it enters the machine. The tire 306 will usually be quite heavy, and it will have an appreciable momentum due to its movement along the ramp 82 and its movement downwardly from the upper end of that ramp; and if that tire was permitted to strike the cutters 302 it could break them. However, when the lever 238 is in retracted position, and the lever 90 is in the dashed line position of Fig. 1, the tire 306 simply cannot reach the cutters 302. In this way, the insertion of a tire 306 can be accomplished safely even by unskilled and careless operators.

The tire 306 should then be lowered to the position shown by solid lines in Fig. 1, where it will engage the flanged supports 158 and 160 and the splines on the shaft 154. As the tire 306 moves downwardly, it will be urged to the solid line position of Fig. 1 by the springs 140 which act upon the reciprocable bearing housings 124 and 126. Hence the tire 306 is urged into positive engagement with the splines on the shaft 154. This spring bias is in addition to the action of gravity on the tire 306, and hence a heavy and positive pressure is created between the tire 306 and the splines on the shaft 154; and that pressure is ample to assure positive rotation of the tire 306. The yielding support for the bearing housings 124 and 126 is very advantageous because it enables the disks 130 and 132 to follow any "low spots" on the surface of the tire 306 and to maintain the same heavy pressure between the tire and the splines on the shaft 154. Hence, full driving of the tire 306 at all times is assured.

When the tire was moved from the ramps 82 into engagement with the sets of disks 118 and 120 and 130 and 132, it moved the disks 130 and 132 upwardly. However, no manual adjustment of the position of those disks was necessary. Further, when the tire 306 moved from the position indicated by dashed lines in Fig. 1 to the position indicated by solid lines in that figure, further movement of the disks 130 and 132 was required. However, once again no manual adjustment of the position of those disks was required. Hence, the present invention provides automatic application of resilient forces to the tire to hold it in engagement with the splines on the shaft 154, and it thereby avoids precise and repeated adjustments of the tire grooving machine.

At this time, the position of the cutters 302 relative to the bracket 248 must be established. This is done by rotating the shaft of the motor 166, as by inserting a wrench in the socket of the shaft of the motor and rotating that wrench. Such rotation will cause slow movement of the sprocket chain 171 and slow movement of the shaft 176. This rotation of the shaft 176 will rotate the drum cam 180 and will force the cam followers 190 and 204 to follow the grooves 184 and 182. The movement of the cam followers 190 and 204 will cause rotation of the levers 188 and 202 about the pivots 186 and 200. This rotation will cause transverse movement of the cross slide 216; and this rotation of the shaft of the motor will be continued until the pointer 316 is squarely in register with a mark on the projecting end of the slotted pin 192. Once the pointer 316 and the mark on the projecting end of the pin 192 have been set in register with each other, the rotation of the shaft of the motor 166 can be stopped.

Thereupon, the operator will check to see whether the center cutter is in register with the center of the tire. If it is, the grooving operation can be commenced. If it is not, the operator loosens the bolt 198 and moves the tie-rod 218 and the cross slide 216 until the center cutter 302 is in register with the center of the tire. Thereafter, the operator tightens the bolt 198. The distance which the tie-rod 218 projects beyond the slotted pin 192 is then measured and the distance which the tie-rod 292 projects beyond the slotted pin 206 is compared with that distance. If the distance which the tie-rod 292 projects beyond the slotted pin 206 is not equal to the distance which the tie-rod 218 projects beyond the slotted pin 192, the bolt 212 is loosened and the tie-rod 292 is moved relative to the slotted pin 206 until the projecting end of the tie rod 292 has the same length as the projecting end of the tie-rod 218. Once this result has been attained, the bolt 212 is again tightened.

At this time the lever 238 can be raised upwardly above the top of stop 242, and then that lever can be moved forwardly to move the platform 222 and bracket 248 toward the tire. Such movement will place the cutters 302 in engagement wtih the tire 306. If those cutters are already hot, it will not be necessary to close the switch 310. However, if the resistance elements 294 are cool, closing of the switch 310 will provide prompt heating of those cutters. As soon as the cutters 302 are hot enough, the operator closes switch 311 and the motor 166 starts to rotate. Rotation of the motor 166 will cause rotation of the sprocket pinion 170 and will thus cause movement of the sprocket chain 171. This forces positive rotation of the shaft 154 and of the shaft 176 through the sprocket wheel 156 and the sprocket pinion 178. The rotation of the shaft 154 will cause the tire 306 to rotate, and rotation of the shaft 176 will cause transverse movement of the cross slide 216 and reciprocable movement of the connecting rod 286. The movement of the cross slide 216 and the movement of the connecting rod 286 are precisely controlled by the drum cam 180 and the grooves 182 and 184. The groove 184 receives the cam follower 190 and forces the lever 188 to rotate about the pivot 186. This provides an oscillatory movement of the lever 188, thereby causing reciprocating movement of the cross slide 216. The groove 182 receives the cam follower 204 and causes oscillation of the lever 202. This oscillation of the lever 202 causes reciprocating movement of the tie-rod 292 and of the connecting rod 286.

The grooves 182 and 184 of the drum cam 180 are interrelated so that whenever the cross slide 216 moves to the right, the cutters 302 will be rotated to the right of dead center. Those cutters will assume a position which is the resultant of the right hand movement of the cross slide 216 and the circumferential movement of the tire 306. As a result, the cutters 302 will be positioned directly parallel to the relative path of movement between those cutters and that tire. This assures smooth and easy grooving of the tire. When the cross slide 216 reaches the end of its right hand path of movement, the lever 202 will rotate about the pivot 200 and move the tie-rod 292 and the connecting rod 286. This movement will cause the pivot clamps 274 to rotate in the openings 263 in the pivot blocks 258, and those clamps 274 will move the cutters 302 through dead center to the left of dead center. As a result, those cutters will quickly assume a position which is parallel to the resultant of the left hand movement of the cross slide 216 and the circumferential movement of the tire 306. Hence, those cutters will be able to form the reverse part of the zigzag groove desired in the tire 306.

The groove 184 in the cam 180 provides a more rapid movement of the cam follower 190 at the beginning of each change of direction than it does during the rest of its movement. This is necessary because the rubber of the tire is resilient and it distorts ahead of the cutters. Hence, when the cross slide 216 has reached the end of one of its paths of movement and starts to move in the opposite direction, the rubber will recover itself and will then have to be distorted in the opposite direction before full cutting can occur. Hence, the groove 184 provides a more rapid movement of the cross slide 216 at the beginning of each path of movement of the cross slide 216 to assure full cutting of the tire by compensating for the yield in the surface of that tire.

The grooves 182 and 184 are interrelated in such a way that the cutters 302 are rotated into the direction of the cut and then kept there until the direction of movement of the cross slide 216 is to be changed. The groove 182 thus provides a forward driving area, a dwell, a rearward driving area and a second dwell. The groove 182 does not appear to provide such four distinct periods but it does do so; and the reason it does not appear to do so is that that groove must compensate for the transverse movement of the cross slide 216. Specifically, while the cutters 302 are to be kept fixed during the dwell period, those cutters are actually moving longitudinally of the guide 214 because they are mounted on and move with the cross slide 216. Hence the lever 202 must move during the dwell period to enable the cutters 302 to remain fixed relative to the cross slide 216.

The motion of the lever 202 is transmitted to the cutters 302 by the tie-rod 292, the connecting rod 286, the pivots 284, the clamps 274 and the rods 264. The pivots 284 are forced to move with the connecting rod 286 by reason of the fact that they are mounted in the pivot blocks 280. As those pivots move, they will cause the clamps 274 to rotate the supports 264; those supports being held for rotation by the openings 263 in the pivot blocks 258. As the clamps 274 rotate, the rods 278 thereon will reciprocate relative to the openings in the ends of the pivots 284.

The motor 166 rotates the tire 306 in a clockwise direction, as that tire is viewed in Fig. 1. This is desirable since it enables the operator to see how the grooving is proceeding. For example, if a stone or nail or piece of glass was embedded in the tire and struck and broke one of the cutters 302, the operator would know it immediately. If the tire 306 was rotating in the opposite direction, the operator might not notice the breaking of a cutter as promptly.

The grooving operation continues until the tire is completely grooved. The tire grooving machine of the present invention provides any desired number of grooves in the surface of the tire and will form all of those grooves simultaneously. When the grooving operation is completed, and that operation requires less than three minutes, the operator opens switch 311 to stop further rotation of the motor 166. If additional tires are to be grooved, the switch 310 is left closed; otherwise that switch is also opened. The lever 238 is then rotated in a clockwise direction, as that lever is viewed in Fig. 7, and the outer end of that lever is lifted upwardly to pass over the stop 242. This movement of lever 238 will move the cutters 302 rearwardly and out of engagement with the tire 306. Thereupon, the operator will rotate the lever 90 to the position shown by dotted lines in Fig. 1. At such time, the tire can then be rolled to the right until it reaches and rolls down the ramp 82.

If one of the cutters 302 is broken during the grooving operation, as by being struck by an embedded nail or piece of glass, the operator need only move the switch 311 to a position where it halts further rotation of the motor 166. Then the operator need only pull the lever 238 rearwardly and set it in engagement with the latch 242. He should then use switch 311 to reverse motor 166 and "back" the tire 306 to a point where fully cut grooves register with the cutters 302. He should then loosen the retaining ring 304, pull out the broken cutter 302 with its plate 298, remove the broken cutter legs from the slots 300 and then insert a new cutter. Once this has been done, the plate 298 is replaced, the threaded retainer 304 is replaced, the lever 238 is moved forwardly to permit the spring 244 to urge the cutter 302 back into the grooves, and then the switch 311 is again moved to the forward position.

The forward and backward movement of the platform 222 must be accommodated and yet the lever 202 must provide positive driving of the connecting rod 286 which is carried by the bracket 248 mounted on the platform 222. This combined result is attained by the slot 290 in the transversely extending end of the connecting rod 286. That slot directly and immediately transmits the forces from the tie-rod 292 to the connecting rod 286, but also permits that connecting rod to move transversely of the lever 202 when the platform 222 is moved.

As long as tires of a given size are being grooved, the position of the flanged disks and the flanged support need not be changed. Further, the setting of the tie-rods 218 and 292 need not be changed. However, the position of the bracket 248 may have to be changed to accommodate uneven wear on the tire. When the king pin of a vehicle is out of alignment, either the inner edge or the outer edge of the tire will wear more rapidly than will the opposite edge. This uneven wear of the tire can be compensated for by the tire grooving machine shown herein by loosening the bolts 254 and rotating the bracket 248 about the pivot 250. Once the bracket has shifted the position of the cutters 302 so they are fully complementary to the face of the tire 306, the bolts 254 are tightened to prevent accidental movement of the bracket 248 relative to the platform 222.

If unusually large tires are to be grooved, the shaft 116 must be moved closer to the ramp 82. Similarly, if smaller tires are to be grooved, the shaft 116 will have to be moved further away from the ramp 82. This movement is readily attained by rotating the cam latch 108 downwardly and sliding the angles 100 along the angles 68 and 70. Once the shaft 116 has been placed in the desired position, the cam latches 108 are rotated upwardly to lock the slides 100 in position against accidental movement.

The distance between the grooves formed by the cutters 302 can be varied by loosening the nuts 282 on the threaded ends of pivot blocks 280 and moving those pivot blocks relative to the connecting rod 286. Simultaneously, the pivot blocks 258 should be moved relative to the slot 256 in the bracket 248, and this is done by loosening the bolts 262. Any desired spacing between the cutters 302 can be attained; and the total number of grooves to be cut can be varied by adding or removing further pivot blocks 258 and cutters 302. The drawing shows three cutters 302, but more than three cutters can be used if desired. However, the use of three cutters has been found to be very acceptable.

The platform 222 is biased toward the tire 306 by the spring 244, and that platform will urge the bracket 248 and the cutters 302 toward the tire 306. The cutters will extend into the surface of tire 306, but the smooth faces of the threaded retainers 304 will bear against the face of the tire and limit the distance to which the cutters 302 can extend into the tire. High spots in the tire will force the retainers 304 to move the bracket 248 and platform 222 rearwardly, while low spots in the tire will enable the retainers 304 and the bracket and platform to move forwardly. The overall result is that the threaded retainers 304 follow the surface of the tire and hold the closed ends of the cutters 302 a fixed distance below the surface of the tire. This assures uniform groove depth.

As explained above, the depth of that groove can be varied by varying the distances which the closed ends of the cutters 302 project beyond the threaded retainers 304. The resilient nature of the cutters 302 makes this possible. The width of those grooves can also be varied by using plates 298 with different spacings between the grooves 300, and by using cutters with different spacings between the legs thereof. Grooves as narrow as one eighth of an inch or as wide as three eighths of an inch can be cut.

The cutters 302 of the present invention have sharp cutting edges at their upper and lower faces. One of those cutting edges will be used until it is dulled, and then the cutter 302 is turned over. The second edge will then be used until it too is dulled. Hence the cutters can be used twice as long as the ordinary cutters.

Fig. 7 emphasizes the fact that the central support 258 is shorter than either of the other two supports. This is important since tires have crowned faces. By being shorter, the central support 258 compensates for the crown configuration of the tire, and it assures full seating of all three retainers 304 against the tire face.

In the event a narrower zigzag groove pattern is desired, the slotted pin 192 can be set in the opening 189 in the lever 188. This opening is closer to the pivot 186 than is the opening in which the slotted pin 192 is shown, and hence its path of oscillation is shorter. That shorter path of oscillation will provide a shorter path of reciprocation for cross slide 216, thereby providing a narrower zigzag groove patttern.

At the conclusion of the grooving of tires for any particular period, the switch 310 should be opened to permit the heating elements 294 to cool. In the event one of these heating elements burns out, it can be readily replaced by simply pulling it out of the recess in the upper end of the support 264 and by inserting a new heating element. The leads 296 of the old heating element will be disconnected and the leads of the new heating element will be connected in their stead.

It is possible, by loosening the bolts 198 and 212 to avoid reciprocation of the cross slide 216 and of the connecting rod 286; and where this is done, the machine can form straight grooves in the tire. By using a different cam than the cam 180, the machine can provide groove patterns of different size and shape.

Whereas the drawing and accompanying description have shown and described a preferred embodiment of the present invention it should be apparent to those skilled in the art that various changes may be made in the form of the invention without affecting the scope thereof.

What I claim is:

1. A tire-grooving machine that comprises a frame, a plurality of tire-supporting surfaces on said frame to receive and support a tire to be grooved, a platform that is spaced from said tire-supporting surfaces, a plurality of cutter heads carried by and movable with said platform, said cutter heads being spaced apart but being closely adjacent each other on said platform to simultaneously confront and engage the face of said tire, said cutter heads having axes substantially perpendicular to said face of said tire, said cutter heads being oscillatable about said axes to recurrently shift the cutters thereof from a right hand inclined position to a left hand inclined position and back, a guide that confines said platform for reciprocable movement toward and away from said tire in a direction generally parallel to said axes of said cutter heads, a source of power, a linkage that extends between said source of power and said cutter heads and that oscillates said cutter heads whether said platform is stationary or moving, and a second linkage that extends between said source of power and said platform to reciprocate said platform in a direction transverse of said axes of said cutter heads, the first said linkage having a sliding connection intermediate the ends thereof to maintain the oscillation of said cutter heads as said platform moves toward and away from said tire.

2. A tire-grooving machine that comprises a frame, a plurality of tire-guiding surfaces on said frame to receive and guide a tire to be grooved, a guide that extends transversely of said frame, a slide that is guided for reciprocable movement transversely of said frame by said guide, a plurality of pivoted arms that are mounted on said slide and have their axes substantially perpendicular to said guide, a plurality of cutter heads carried by and rotatable with said pivoted arms, a connecting rod that connects said pivoted arms for conjoint and simultaneous movement, a cam surface that provides positive drive in opposite directions, a linkage between said cam surface and said slide to reciprocate said slide transversely of said frame, and a second linkage between a second cam surface that provides positive drive in opposite directions and said connecting rod, said second link reciprocating said connecting rod and thereby oscillating said pivoted arms about their axes.

3. A tire-grooving machine that comprises a frame, a plurality of tire-guiding surfaces on said frame to receive and guide a tire to be grooved, a guide that extends transversely of said frame, a slide that is guided for reciprocable movement transversely of said frame by said guide, a slot in said guide, a plurality of pivoted arms that are mounted in said slot in said slide and can be set at different spacings in said slot in said slide, and have their axes substantially perpendicular to said guide, a plurality of cutter heads carried by and rotatable with said pivoted arms, a connecting rod that connects said pivoted arms for conjoint and simultaneous movement, a cam surface that provides positive drive in opposite directions, a linkage between said cam surface and said slide to reciprocate said slide transversely of said frame, and a second linkage between a second cam surface that provides positive drive in opposite directions and said connecting rod, said second link reciprocating said connecting rod and thereby oscillating said pivoted arms about their axes.

4. A tire-grooving machine that comprises a frame, a plurality of tire-guiding surfaces on said frame to receive and guide a tire to be grooved, a guide that extends transversely of said frame, a slide that is guided for reciprocable movement transversely of said frame by said guide, a plurality of pivoted arms that are mounted on said slide and have their axes substantially perpendicular to said guide, a plurality of cutter heads carried by and rotatable with said pivoted arms, a connecting rod that connects said pivoted arms for conjoint and simultaneous movement, a source of power, a linkage between said source of power and said slide to reciprocate said slide transversely of said frame, and a second linkage between said source of power and said connecting rod to reciprocate said connecting rod and thereby oscillate said pivoted arms about their axes, the first said linkage including a positive action cam that provides positive drive in opposite directions, said second linkage including a positive action cam that provides positive drive in opposite directions, said positive action cams being interconnected for simultaneous movement.

5. A tire-grooving machine that comprises a frame, a plurality of tire-guiding surfaces on said frame to receive and guide a tire to be grooved, a guide that extends transversely of said frame, a slide that is guided for reciprocable movement transversely of said frame by said guide, a plurality of pivoted arms that are mounted on said slide and have their axes substantially perpendicular to said guide, a plurality of cutter heads carried by and rotatable with said pivoted arms, a connecting rod that connects said pivoted arms for conjoint and simultaneous movement, a source of power, a linkage between said source of power and said slide to reciprocate said slide transversely of said frame, said linkage including a cam that provides positive drive in opposite directions, and a second linkage between said source of power and said connecting rod to reciprocate said connecting rod and thereby oscillate said pivoted arms about their axes, said second linkage including a cam that has a forwardly driving area, a dwell area, a rearwardly driving area, and a second dwell area, said forwardly driving area moving said connecting rod to tilt said pivoted arms to one side, the first said dwell area permitting said pivoted arms to remain tilted to said one side, said rearwardly driving areas moving said connecting rod to tilt said pivoted arms through dead center to the opposite side, and said second dwell area permitting said pivoted arms to remain tilted to said opposite side.

6. A tire-grooving machine that comprises a frame, a plurality of tire-guiding surfaces on said frame to receive and guide a tire to be grooved, a guide that extends transversely of said frame, a slide that is guided for reciprocable movement transversely of said frame by said guide, a slot in said guide, a plurality of pivoted arms that are mounted in said slot in said slide and can be set at different spacings in said slot in said slide and have their axes substantially perpendicular to said guide, a plurality of cutter heads carried by and rotatable with said pivoted arms, a connecting rod that connects said pivoted arms for conjoint and simultaneous movement, a source of power, a linkage between said source of power and said slide to reciprocate said slide transversely of said frame, and a second linkage between said source of power and said connecting rod to reciprocate said connecting rod and thereby oscillate said pivoted arms about their axes, said pivoted arms being selectively movable toward and away from each other to accommodate tires of different width.

7. A tire-grooving machine that comprises a frame, a plurality of tire-supporting surfaces on said frame to receive and support a tire to be grooved, a platform that is spaced from said tire-supporting surfaces, a plurality of cutter heads, a bracket that supports said cutter heads, a pivot that connects said bracket with said platform but permits said bracket to rotate relative to said platform, and a releasable holding means that selectively locks said bracket against rotation relative to said platform, said bracket being rotatable relative to said platform upon release of said holding means to accommodate tires that are worn more heavily on one side than on the other side.

8. A tire-grooving machine that comprises a frame, a plurality of tire-supporting surfaces on said frame to receive and support a tire to be grooved, a platform that is spaced from said tire-supporting surfaces, a plurality of cutter heads carried by and movable with said platform, said cutter heads being spaced apart but being closely adjacent each other on said platform to simultaneously confront and engage the face of said tire, said cutter heads having axes substantially perpendicular to said face of said tire, said cutter heads being oscillatable about said axes to recurrently shift the cutters thereof from a right hand inclined position to a left hand inclined position and back, a guide that confines said platform for reciprocable movement toward and away from said tire in a direction generally parallel to said axes of said cutter heads, a linkage that oscillates said cutter heads whether said platform is stationary or moving and a handle to move said platform relative to said face of said tire.

9. A tire-grooving machine that comprises a frame, a plurality of tire-supporting surfaces on said frame to receive and support a tire to be grooved, a platform that is spaced from said tire-supporting surfaces, a plurality of cutter heads carried by said platform, said cutter heads being spaced apart but being closely adjacent each other on said platform to simultaneously confront and engage the face of said tire, said cutter heads having axes substantially perpendicular to said face of said tire, said cutter heads being oscillatable about said axes to recurrently shift the cutter thereof from a right hand inclined position to a left hand inclined position and back, a guide that confines said platform for movement toward and away from said tire in a direction generally parallel to said axes of said cutter heads, a linkage that oscillates said cutter heads whether said platform is stationary or moving, and a handle to move said platform relative to said face of said tire, said cutter heads being adjustable relative to said platform and relative to each other to accommodate tires having faces of different widths.

10. A tire-grooving machine that comprises a frame, a plurality of tire-supporting surfaces on said frame to receive and support a tire to be grooved, a platform that is spaced from said tire-supporting surfaces, a slotted bracket on said platform, a plurality of cutter heads mounted in and carried by the slot in said bracket on said platform, said cutter heads being spaced apart but being closely adjacent each other in said slot of said bracket on said platform to simultaneously confront and engage the face of said tire, said cutter heads having axes substantially perpendicular to said face of said tire, said cutter heads being oscillatable about said axes to recurrently shift the cutters thereof from a right hand inclined position to a left hand inclined position and back, a guide that confines said platform for reciprocable movement toward and away from said tire, in a direction generally parallel to said axes of said cutter heads, a linkage that oscillates said cutter heads, and a handle to move said platform relative to said face of said tire, said cutter heads being adjustable relative to said slot in said bracket and relative to said linkage to accommodate tires having faces of different widths.

11. A tire-grooving machine that comprises a frame, a plurality of tire-supporting surfaces on said frame to receive and support a tire to be grooved, a platform that is spaced from said tire-supporting surface, a plurality of cutter heads carried by and movable with said platform, said cutter heads being spaced apart but being closely adjacent each other on said platform to simultaneously confront and engage the surface of said tire, a guide that confines said platform for reciprocable movement toward and away from said tire, and a handle to move said platform relative to said face of said tire, said cutter heads having faces that bear against said face of said tire and limit movement of said platform toward said face of said tire, said cutter heads having knives that project forwardly of said faces and extend into the said face of said tire.

12. A tire-grooving machine that comprises a frame, a plurality of tire-supporting surfaces on said frame to receive and support a tire to be grooved, a platform that is spaced from said tire-supporting surface, a plurality of cutter heads, a bracket that carries said cutter heads, said cutter heads being adjustable relative to said bracket and being rotatable relative to said bracket, a pivot that connects said bracket to said platform but permits rotation of said bracket relative to said platform, releasable holding means that selectively locks said bracket against rotation relative to said platform, said bracekt being rotatable relative to said platform to accommodate tires that are worn more heavily on one side than on the other side, a slide that is movable transversely of said frame, a guide on said slide that confines said platform for movement transversely of said slide and longitudinally of said frame, a source of power, a linkage that extends between said source of power and said cutter heads to rotate said cutter heads relative to said bracket, and a second linkage that extends between said source of power and said slide to move said slide, the first said linkage having a sliding connection intermediate the ends thereof to accommodate the reciprocation of said platform and the rotation of said bracket relative to said platform.

References Cited in the file of this patent

UNITED STATES PATENTS

| | | |
|---|---|---|
| 1,567,472 | Skiles | Dec. 29, 1925 |
| 1,624,913 | Ames | Apr. 19, 1927 |
| 1,813,264 | Wikle | July 7, 1931 |
| 1,942,986 | St. John | Jan. 9, 1934 |
| 1,975,930 | Errig | Oct. 9, 1934 |
| 2,000,129 | Dunnam | May 7, 1935 |
| 2,034,662 | McLaughlin | Mar. 17, 1936 |
| 2,086,020 | Errig | July 6, 1937 |
| 2,089,864 | Vayan | Aug. 10, 1937 |
| 2,178,665 | Janowski | Nov. 7, 1939 |
| 2,183,376 | Wilke | Dec. 12, 1939 |
| 2,254,974 | Olson | Sept. 2, 1941 |
| 2,362,967 | Bivans | Nov. 21, 1944 |
| 2,618,056 | Van Alstine | Nov. 18, 1952 |
| 2,638,984 | Errig | May 19, 1953 |

FOREIGN PATENTS

| | | |
|---|---|---|
| 426,748 | Great Britain | Apr. 9, 1935 |
| 525,466 | Great Britain | Aug. 28, 1940 |
| 723,079 | Germany | July 29, 1942 |